2 Sheets--Sheet 1.
R. M. HOE.
Feeding Paper to Printing-Presses.
No. 5,947. Reissued June 30, 1874.
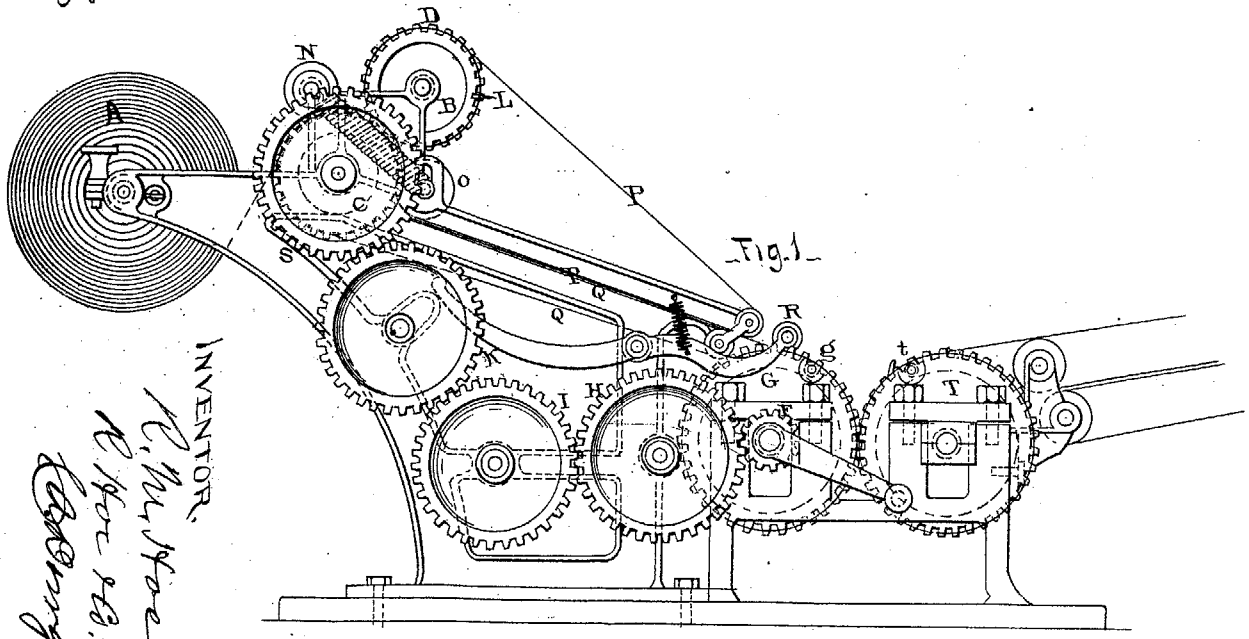
WITNESSES.
J. P. Crawford
E. C. Johnson
INVENTOR.
R. M. Hoe
R. Hoe & Co. Assignees
L. A. Dargin Atty
AM. PHOTO-LITHOGRAPHIC Co. N. Y. (OSBORNE'S PROCESS.)

2 Sheets--Sheet 2.
R. M. HOE.
Feeding Paper to Printing-Presses.
No. 5,947. Reissued June 30, 1874.
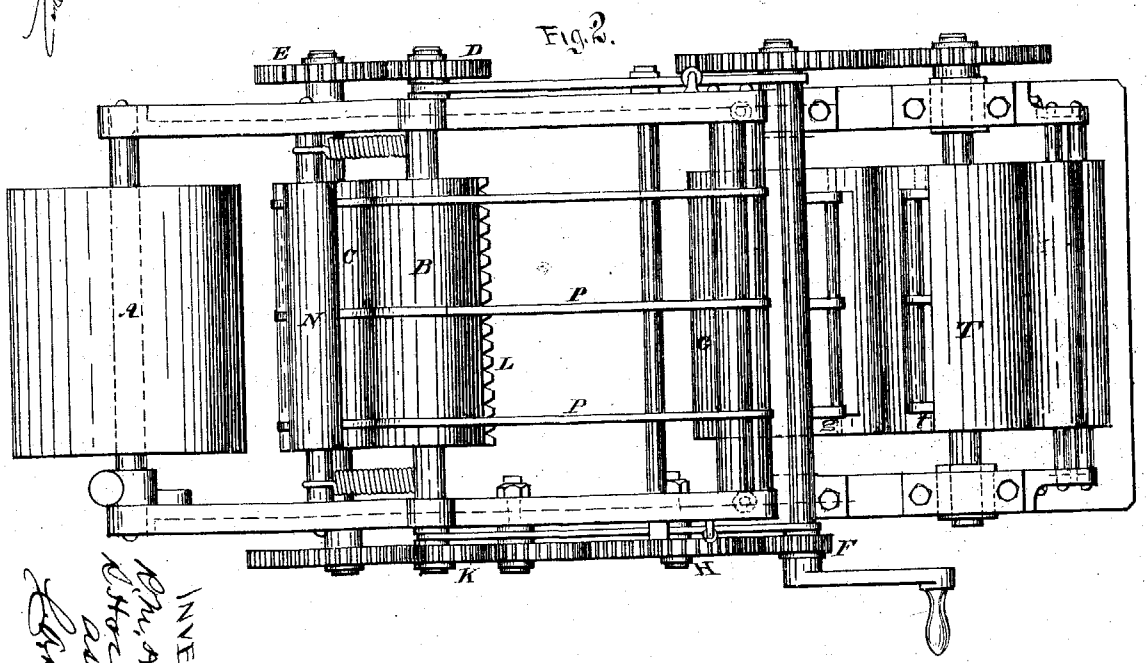
WITNESSES.
J. P. Crawford
E. H. Johnson
INVENTOR.
R. M. Hoe
R. Hoe & Co
assignees
L. A. Dunquin
Atty
AM. PHOTO-LITHOGRAPHIC Co. N. Y. (OSBORNE'S PROCESS.)

UNITED STATES PATENT OFFICE.

RICHARD M. HOE, OF NEW YORK, N. Y.

IMPROVEMENT IN FEEDING PAPER TO PRINTING-PRESSES.

Specification forming part of Letters Patent No. 25,199, dated August 23, 1859; reissue No. 4,429, dated June 20, 1871; extended seven years; reissue No. 5,947, dated June 30, 1874; application filed September 19, 1873.

*To all whom it may concern:*

Be it known that RICHARD M. HOE, of the city, county, and State of New York, did invent certain new and useful Improvements in the Mode of Feeding Paper to Printing-Presses, of which the following is a specification:

My invention relates to printing-presses in which the sheet is printed on both sides before leaving the press; and consists in feeding a printing-machine from a continuous web of paper, a mechanism to puncture or slit the paper in lines across it to form the sheets and leave sufficient material unpunctured to carry the front end of the succeeding sheet forward, and a mechanism for sundering, holding, and conveying the sheets, as will be fully described hereafter.

Figure 1 of the drawings shows a side elevation, and Fig. 2 a plan, of a printing-machine with my invention and improvements combined.

The web of paper from which the sheets are printed is represented at A. The sheets are punctured in a line across the web of paper by passing between cylinders C B, (the latter armed with the cutter L,) whose circumference is just equal to the length of the sheet to be punctured and sundered from the roll. They are geared together by the wheels D E, and driven by the pinion F on the shaft of the impression-cylinder G, through the intervention of the gears H I K S. The gear S is keyed to the shaft of the cutting-cylinder C, and the pinion F upon the impression-cylinder shaft, and in proportion of three to one, for the reason that the impression-cylinder G makes three revolutions to each sheet printed, while the cutting-cylinders make but one. When the sheet is seized by the nippers *g* of the first impression-cylinder, it is carried around to receive the impression upon one side from the type-cylinder beneath the impression-cylinder G, and upon the next revolution it is seized by the nippers *t* of the second impression-cylinder T, and brought in contact with the second type-cylinder, beneath the second impression-cylinder T, to receive the impression on the other side. The cylinder G, therefore, does not come in proper position to take the next sheet until its third revolution, as the first sheet is not taken off until the second revolution, and it has another revolution to make before the nippers *g* are in position to take the second sheet. The cutter L is fixed in the periphery of the cylinder B, and is parallel to the axis thereof, and projects beyond its surface. Its edge is formed into a series of teeth with sharp edges, so as to cut a series of punctures or slits across the paper for forming the sheet, leaving a portion of the paper uncut sufficient to convey the front edge of the succeeding sheet forward for the other operations of sundering and printing. They will thus be partially severed from the web of paper. The surface of the cylinder C is grooved longitudinally at the point where the cutting-knife comes in contact with it, into which groove the knife enters as the cylinders revolve. After being acted upon by the cutter L the paper is conveyed still further forward in its partially-severed condition, by the tapes P Q, to the impression-cylinder G, where the sheet is seized by the drop-roller R, operated by a cam on the shaft of the wheel K, and, by the greater speed of this drop-roller and the cylinder G, is sundered from the web of paper. The conveying-tapes P Q pass around the cylinders B C at points where portions of the cutter have been removed for the purpose, and as they approach the cylinder G their inner surfaces are separated, for the speed of these tapes is only one-third that of the impression-cylinder; and if their surfaces impinging on the paper were close enough to create such an amount of friction on the sheet as to prevent its being moved, save with them, then it would be torn into shreds on its being seized between the impression-cylinder and the drop-roller. The object of separating the tapes at their lower point is therefore obvious, for, although the tapes create sufficient friction with the punctured web of paper to carry it forward to the impression-cylinder, yet their separation allows the sheets to be readily torn apart and drawn from between the tapes when seized by the drop-roller and cylinder. The two pressure-rollers N O, arranged around the circumference of the cylinder C, hold the paper smoothly upon the cylinder, and properly distended to be acted upon by the impaling-knife.

My said invention is applicable to printingmachines in which the paper is printed on one side only, or to perfecting-machines that print both sides at one operation.

It is not intended to limit this invention to the precise construction herein described, as equivalents may be substituted for the elements thereof without changing the character of the invention.

I claim—

1. In combination, the feeding mechanism, puncturing mechanism, and a printing mechanism, for feeding paper from a roll, and puncturing the sheet in its passage to the printing-machine, constructed and operating substantially as described and specified.

2. The puncturing-cylinders for puncturing the sheet, and leaving it united in part, in combination with conducting-tapes for carrying the paper to the printing-machine, constructed and operating as described.

3. The drop-roller, combined with the cylinder G, for sundering the punctured sheet from that behind it, constructed and operating substantially as described.

4. The conducting-tapes, separated at the point of delivery of the sheet to the printing-cylinders, so that the unpunctured portions of the sheet will be left free to be sundered from that behind it, constructed and operating substantially as described.

5. The combination, with the puncturing-cylinders, of the pressure-rollers, for keeping the sheet distended, substantially as described and specified.

RICHD. M. HOE.

Witnesses:
ROBERT COCHRAN,
CHAS. W. CARPENTER.